(12) United States Patent
Albrecht et al.

(10) Patent No.: US 7,622,190 B2
(45) Date of Patent: Nov. 24, 2009

(54) COMPOSITION COMPRISING LITHIUM COMPOUND AND MIXED METAL HYDROXIDES AND THEIR PREPARATION AND USE

(75) Inventors: Sven Albrecht, Goslar (DE); Michael Kruft, Brights Grove (CA); Armin Olbrich, Seesen (DE); Stefan Malcus, Goslar (DE); Wolfgang Wiezoreck, Selb (DE); Trevor McLeod, Sarnia (CA); Shuja Siddiqui, Sarnia (CA); Rob Rops, Petrolia (CA); Hirofumi Hori, Ibaraki (JP)

(73) Assignee: Toda Kogyo Europe GmbH, Dusseldorf (DE)

( * ) Notice: Subject to any disclaimer, the term of this patent is extended or adjusted under 35 U.S.C. 154(b) by 436 days.

(21) Appl. No.: 11/224,608

(22) Filed: Sep. 12, 2005

(65) Prior Publication Data
US 2006/0089257 A1    Apr. 27, 2006

(30) Foreign Application Priority Data
Sep. 15, 2004   (DE) ................... 10 2004 044 557

(51) Int. Cl.
*B32B 5/16*   (2006.01)
*C01F 7/34*   (2006.01)
*C01G 1/02*   (2006.01)

(52) U.S. Cl. .................. 428/403; 423/111; 423/119; 423/138

(58) Field of Classification Search ................. 428/403; 423/111, 119, 138
See application file for complete search history.

(56) References Cited

U.S. PATENT DOCUMENTS

| | | | |
|---|---|---|---|
| 6,153,334 A | 11/2000 | Sakamoto et al. | 429/223 |
| 6,207,325 B1 | 3/2001 | Matsui et al. | 429/231.1 |
| 6,407,031 B1 * | 6/2002 | Chaturvedi et al. | 502/311 |
| 6,649,304 B2 * | 11/2003 | Tani et al. | 429/223 |
| 6,656,873 B2 * | 12/2003 | Chaturvedi et al. | 502/312 |
| 6,958,139 B1 * | 10/2005 | Glemser et al. | 423/594.19 |
| 7,141,528 B2 * | 11/2006 | Hampden-Smith et al. | 502/180 |
| 2002/0110518 A1 | 8/2002 | Okuda et al. | 423/594 |

FOREIGN PATENT DOCUMENTS

| | | |
|---|---|---|
| EP | 0 918 041 A1 | 5/1999 |
| EP | 1 044 927 A1 | 10/2000 |
| JP | 2001-106534 | 4/2001 |

* cited by examiner

*Primary Examiner*—H. (Holly) T Le
(74) *Attorney, Agent, or Firm*—Nixon & Vanderhye P.C.

(57) ABSTRACT

The present invention relates to a particulate mixed metal hydroxide that includes nickel, cobalt and aluminium. The powder particles have a core of nickel/cobalt hydroxide, and a surface that is coated with amorphous aluminium hydroxide. A process for the continuous preparation of such mixed metal hydroxides is also described. The process includes precipitating aluminium hydroxide in the presence of a nickel/cobalt mixed hydroxide in a tube reactor. The mixed metal hydroxides of the present invention may be used to prepare active materials for positive electrodes of a secondary battery.

3 Claims, 1 Drawing Sheet

COMPOSITION COMPRISING LITHIUM COMPOUND AND MIXED METAL HYDROXIDES AND THEIR PREPARATION AND USE

CROSS REFERENCE TO RELATED PATENT APPLICATION

The present patent application claims the right of priority under 35 U.S.C. § 119 (a)-(d) of German Patent Application No. 10 2004 044 557, filed Sep. 15, 2004.

FIELD OF THE INVENTION

The invention relates to a powdery (particulate) mixed metal hydroxide based on the metals nickel, cobalt and aluminium, wherein the powder particles have a core of nickel/cobalt hydroxide, on the surface of which amorphous aluminium hydroxide is deposited. The invention furthermore relates to a process for the continuous preparation of such mixed metal hydroxides by precipitation of aluminium hydroxide in the presence of a nickel/cobalt mixed hydroxide in a tube reactor, and to the use of the mixed metal hydroxides for the preparation of active materials for positive electrodes of a secondary battery.

BACKGROUND OF THE INVENTION

Due to the ever more progressive miniaturization of portable electronic equipment, the demand for ever smaller and lighter secondary batteries which serve as an energy source for such equipment has risen at tremendous speed in recent years.

It has been found that high energy densities can be achieved in particular with lithium secondary batteries. This type of secondary battery is distinguished by a positive electrode, the active material of which can reversibly embed and release lithium ions. The embedding of lithium ions takes place in certain layers of the crystal lattice of the active material and proceeds all the more efficiently the fewer defects there are in the layer structure of the crystal lattice. $LiCoO_2$ in particular is employed successfully as the active material. $LiCoO_2$ is distinguished by a very stable crystal structure, and secondary batteries in which the $LiCoO_2$ achieves a discharge capacity of about 150 mAh/g at an average potential of 3.7 V can be produced therefrom. On the basis of the high costs for cobalt, alternative active materials which, where possible, also render even better discharge capacities are being intensively sought. $LiNiO_2$ has acquired great interest in this respect, since it has been found that when $LiNiO_2$ is employed, discharge capacities of more than 200 mAh/g can be achieved. However, $LiNiO_2$ is significantly more susceptible to the development of defects in the crystal structure than $LiCoO_2$, so that a sufficiently high cycle stability does not result when $LiNiO_2$ is employed.

It has therefore been proposed to employ as the active material $LiNiO_2$ which contains further metals in addition to nickel. In particular, doping with cobalt and aluminium has proved advantageous. Thus, doping with cobalt and aluminium increases the heat stability. However, aluminium does not contribute towards the discharge capacity and should therefore be added in such a small amount that although the desired increase in stability is achieved, an unnecessary increase in weight is avoided. In this context, it is decisive that the aluminium is homogeneously distributed in the active material.

In the preparation of the active materials, typically a lithium compound is mixed with hydroxides of the desired metal components and the mixture is calcined. The homogeneity of the distribution of the metal components in the crystal lattice of the active material depends considerably on how successfully a homogeneous distribution of the constituents is to be already achieved in the mixture to be calcined. It has been found that conventional mixing and grinding of the lithium compound, nickel component, cobalt component and aluminium component is not suitable for reliably mixing large amounts homogeneously.

Attempts have therefore already been made to employ mixed metal hydroxides in which the metals are already homogeneously distributed, instead of the simple hydroxides of the desired metal components. Thus, mixed nickel/cobalt hydroxides in which the metals are homogeneously distributed in a solid solution are obtained by co-precipitation. On the other hand, the co-precipitation of mixed metal hydroxides which comprise nickel and aluminium presents difficulties, since as the amount of aluminium added increases, the filterability of the co-precipitate formed decreases, and the removal of the anions of the metal salts employed during the co-precipitation also becomes problematic.

JP 11-016752 therefore proposes starting from nickel hydroxide or a nickel/cobalt hydroxide and depositing aluminium hydroxide thereon. For this, an alkali metal aluminate is first dissolved in a suspension containing the optionally cobalt-containing nickel hydroxide. The then strongly alkaline suspension is neutralized by dropwise addition of an acid, as a result of which aluminium hydroxide is formed, which precipitates out, with mixing and adsorption on the surface of the nickel hydroxide. The suspension is stirred intensively during this procedure. After conclusion of the addition of an acid, the mixture is stirred for about a further 30 minutes and the precipitate is then filtered off and dried. The precipitate obtained in this way is redispersed in water, washed and finally dried again. Due to the long dwell time in the precipitation reactor, the high concentration of solid in the suspension and the intensive stirring required, the particles are exposed to severe friction, so that there is the danger that aluminium hydroxide particles which have already been adsorbed are partly abraded away from the surface of the nickel hydroxide. The long dwell time in the precipitation reactor and the very slow change in pH by dropwise addition of an acid furthermore cause aluminium hydroxide particles of different crystal structure or morphology to form. The saturation concentration for the aluminium compound is reached and exceeded very slowly, so that comparatively large aluminium hydroxide particles of high crystallinity form. This has the consequence that the aluminium can diffuse poorly into the core of the mixed metal hydroxide particles during the subsequent thermal reaction of mixed metal hydroxide and lithium compound. There is the danger of the formation of undesirable lithium aluminate phases, such as $Li_5AlO_4$ and $LiAlO_2$, and a uniformly homogeneous distribution of aluminium in the material formed is not ensured.

JP 2001-106534 A1 also discloses mixed metal hydroxides which are employed as a starting material for the preparation of active material for the positive electrode of a secondary battery. Co-precipitated nickel/cobalt hydroxide is again used as the starting material, and is coated with aluminium hydroxide. Coating is carried out in a reaction tower by addition of an aluminium nitrate solution. The pH is adjusted to weakly basic, so that the aluminium nitrate is converted into aluminium hydroxide, which is deposited on the surface of the nickel/cobalt hydroxide. Coating is again carried out with stirring, so that in this procedure also the coated particles are exposed to severe mechanical stress and there is the danger of detachment of the aluminium hydroxide from the surface of the nickel/cobalt hydroxide. The reaction conditions in a stirred reaction tower in turn cause a long dwell time and the formation of aluminium hydroxide particles of high crystallinity. In the material obtained in this way, the aluminium thus also can diffuse poorly into the core of the mixed metal hydroxide particles during the subsequent thermal reaction of mixed metal hydroxide and lithium compound, so that a homogeneous distribution of the aluminium in the material formed is not ensured.

SUMMARY OF THE INVENTION

The object of the present invention is therefore to provide mixed metal hydroxides comprising nickel, cobalt and aluminium which are suitable for the preparation of active materials for positive electrodes of secondary batteries, the metals being homogeneously distributed in the active material. The object of the present invention is furthermore to provide an economical process for the preparation of such mixed metal hydroxides.

The object is achieved by mixed metal hydroxides, the particles of which have a core of nickel/cobalt hydroxide and a coating of amorphous aluminium hydroxide. The present invention therefore provides a mixed metal hydroxide comprising the metals nickel, cobalt and aluminium, wherein the mixed metal hydroxide is in powdery form and the powder particles have a core of nickel/cobalt hydroxide, the surface of which is coated with amorphous aluminium hydroxide.

In accordance with the present invention there is also provided, a process for preparing the mixed metal hydroxide as described above, that involves precipitating aluminium hydroxide in the presence of cobalt-containing nickel hydroxide, by means of, a) feeding continuously into a tube reactor, an aqueous suspension of cobalt-containing nickel hydroxide, and an aqueous solution of an alkali metal aluminate, thereby forming a mixture of said aqueous suspension of cobalt-containing nickel hydroxide and said aqueous solution of said alkali metal, and b) neutralizing the mixture of said aqueous suspension and said aqueous solution as it flows through said tube reactor, thereby converting the alkali metal aluminate into aluminium hydroxide.

Unless otherwise indicated, all numbers or expressions, such as those expressing quantities of ingredients, mole and volume percents, process conditions, etc., used in the specification and claims are understood as modified in all instances by the term "about."

DETAILED DESCRIPTION OF THE INVENTION

Due to the amorphous structure of the aluminium hydroxide, the aluminium can diffuse easily into the core of the mixed metal hydroxide particles during the thermal reaction of a mixture of mixed metal hydroxide according to the invention and a lithium compound. The aluminium is therefore distributed substantially homogeneously in the active material formed for the positive electrode of a secondary battery.

In addition to nickel, cobalt and aluminium, the mixed metal hydroxides according to the invention can comprise further metals. Thus, doping with one or more of the metals titanium, vanadium, chromium, manganese, iron, yttrium, zirconium and molybdenum is possible.

However, in addition to impurities, the mixed metal hydroxides according to the invention preferably contain exclusively the metals nickel, cobalt and aluminium. The mixed metal hydroxides particularly preferably contain 50 to 93 mol % Ni, 5 to 30 mol % Co and 2 to 20 mol % Al, in each case based on the total amount of Ni, Co and Al, the sum of the contents of Ni, Co and Al being 100 mol %. In particular, the mixed metal hydroxides preferably contain 70 to 90 mol % Ni, 8 to 20 mol % Co and 2 to 10 mol % Al, in each case based on the total amount of Ni, Co and Al, the sum of the contents of Ni, Co and Al being 100 mol %. 80 mol % Ni, 15 mol % Co and 5 mol % Al and 82 mol % Ni, 15 mol % Co and 3 mol % Al may be mentioned as very particularly preferred compositions.

According to the invention, the particles of the mixed metal hydroxide have a core of nickel/cobalt hydroxide and a coating of amorphous aluminium hydroxide. In the context of this invention, a coating of amorphous aluminium hydroxide is present if the mixed metal hydroxide has no signals of a crystalline aluminium hydroxide phase in an x-ray diffraction analysis, the x-ray diffraction analysis being carried out with a Phillips X'pert MPD diffractometer having the following measurement parameters:

| | |
|---|---|
| Voltage: | 50 kV |
| Current: | 40 mA |
| Anode: | copper |
| Soller: | 0.04 rad |
| Divergence diaphragm: | 1° |
| Scattered ray diaphragm: | 1° |
| Receiving slit: | 0.2 mm |
| Step size: | 0.02° = 2theta |
| Measurement time per step: | 0.5 s |

The mixed metal hydroxide according to the invention is distinguished in particular in that in an x-ray diffraction analysis carried out under the conditions described above, no signals are detected at 2theta 27-28° and 40-41°. These signals correspond to crystalline aluminium hydroxide of the very common bayerite phase.

Figure 1:
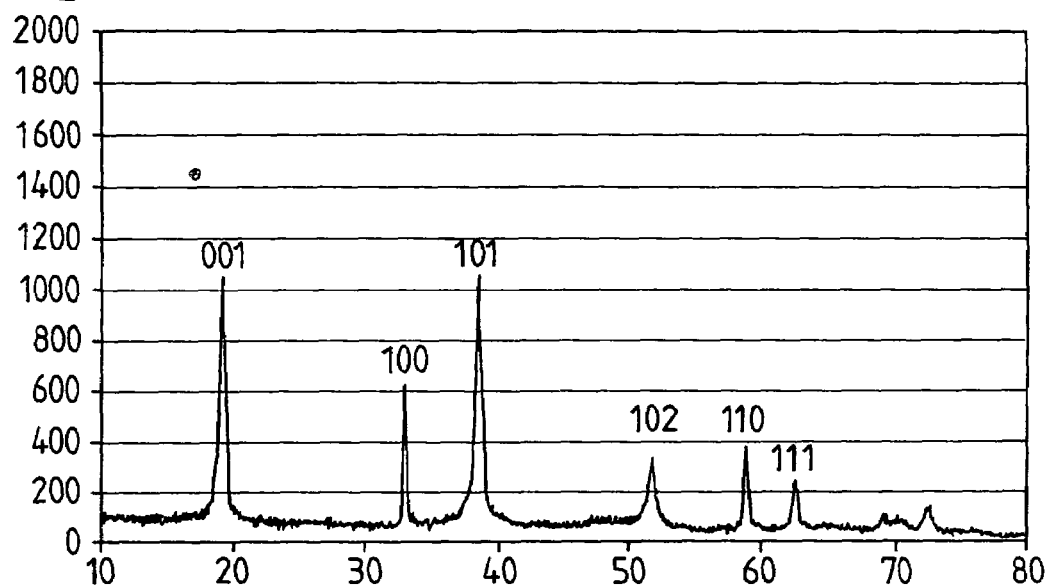
FIG. 1 is a graphical representation of an x-ray diffraction spectrum of a mixed metal hydroxide according to the present invention, which was prepared in accordance with the description of Example 1 herein.

FIG. 1 shows by way of example an x-ray diffraction spectrum of a mixed metal hydroxide according to the invention which was prepared according to Example 1. The x-ray diffraction analysis was carried out under the conditions described above. It can be clearly seen that only signals which correspond to the crystal structure of phase-pure $Ni(OH)_2$ are obtained. Signals which could be assigned to a crystalline phase of $Al(OH)_3$ are absent (e.g., signals at 27-28° and 40-41° 2theta). The coating is accordingly amorphous aluminium hydroxide.

Typically, the mixed metal hydroxides according to the invention have a closed coating of aluminium hydroxide. However, it is not ruled out that some of the particles of the mixed metal hydroxide have a coating which does not cover the entire surface of the core material. Preferably, however, in the mixed metal hydroxide according to the invention at least 90% of the particles have a surface coating with amorphous aluminium hydroxide which covers at least 90% of the surface of the core of nickel/cobalt hydroxide. Particularly preferably, in the mixed metal hydroxide according to the invention at least 95% of the particles have a surface coating with amorphous aluminium hydroxide which covers at least 95% of the surface of the core of nickel/cobalt hydroxide.

Figure 2:
FIG. 2 is a representative scanning electron microscope image (1500-fold magnification) of a mixed metal hydroxide according to the present invention, which was prepared in accordance with the description of Example 1 herein.

FIG. 2 shows by way of example an image, recorded with a scanning electron microscope (SEM) (1,500-fold magnification), of a mixed metal hydroxide according to the invention which was prepared according to Example 1. The particles shown have a closed and dense coating with amorphous $Al(OH)_3$.

Preferably, the mixed metal hydroxides according to the invention have a specific surface area (BET surface area) of from 3 to 30 $m^2/g$, particularly preferably from 5 to 20 $m^2/g$.

The average particle size D50, determined in accordance with ASTM B 822 on the MasterSizer Sµ measuring instrument from Malvern, is preferably 1 to 30 µm, particularly preferably 5 to 20 µm.

The tap density of the mixed metal hydroxides according to the invention is preferably >1.5 $g/cm^3$, particularly preferably >1.8 $g/cm^3$ and very particularly preferably >2.0 $g/cm^3$.

The invention furthermore relates to an effective process for the preparation of the mixed metal hydroxides according to the invention.

The present invention therefore also provides a process for the preparation of the mixed metal hydroxides according to the invention by precipitation of aluminium hydroxide in the present of cobalt-containing nickel hydroxide, wherein
  a) an aqueous suspension of the cobalt-containing nickel hydroxide and an aqueous solution of an alkali metal aluminate are fed continuously to a tube reactor, and
  b) the mixture of the suspension and solution is neutralized on flowing through the tube reactor, as a result of which the alkali metal aluminate is converted into aluminium hydroxide.

The process according to the invention allows the reliable deposition of amorphous $Al(OH)_3$ on to the surface of the nickel/cobalt hydroxide particles. Moreover, this process is distinguished by a continuous process procedure, and in that the particles are exposed to only mild mechanical stress in a tube reactor, so that aluminium hydroxide which has been deposited is not abraded away from the surface of the nickel/cobalt hydroxide.

The cobalt-containing nickel hydroxide which is employed is preferably one which is prepared by means of known co-precipitation processes. For example, a nickel compound and a cobalt compound, for example nickel sulfate and cobalt sulfate, can be dissolved in water and the desired mixed hydroxide can then be co-precipitated by addition of a base, preferably by addition of a mixture of ammonia and sodium hydroxide. The co-precipitated cobalt-containing nickel hydroxide can be worked up in a known manner, for example by filtration, washing and drying. The cobalt-containing nickel hydroxide can then be suspended in water and reacted further. Preferably, however, in the process according to the invention co-precipitated cobalt-containing nickel hydroxide which is transferred into an agglomeration tank after the co-precipitation, without further isolation, is used as the starting material, and is fed from this tank into the tube reactor. In this procedure, the co-precipitated cobalt-containing nickel hydroxide always remains in the aqueous medium, so that separate suspending is unnecessary.

The amounts ratio of nickel to cobalt in the cobalt-containing nickel hydroxide can be adjusted within wide limits and depends on the composition of the desired aluminium-containing mixed metal hydroxide. Cobalt-containing nickel hydroxide of the formula $Ni_xCo_{1-x}(OH)_2$, wherein x represents 0.60 to 0.95, is accordingly preferably employed.

Preferably, the aqueous suspension of the cobalt-containing nickel hydroxide contains the cobalt-containing nickel hydroxide in an amount of from 0.1 to 1.8 mol/l, particularly preferably in an amount of from 0.2 to 1.0 mol/l. This comparatively low solids content in the suspension ensures that impact and friction between the particles and therefore the mechanical stress, which can lead to abrading of aluminium hydroxide particles deposited on the surface of the solid particles, are minimized.

The aqueous solution of the alkali metal aluminate preferably contains the alkali metal aluminate in a concentration of 1 to 10 mol/l, particularly preferably in a concentration of 2 to 8 mol/l. Any desired alkali metal aluminate, for example potassium aluminate or sodium aluminate, or also a mixture of various alkali metal aluminates can be employed. Preferably, however, sodium aluminate is employed.

The amounts of aqueous suspension of the cobalt-containing nickel hydroxide and solution of the alkali metal aluminate employed are chosen such that the desired stoichiometry is established in the mixed metal hydroxide.

The aqueous suspension of the cobalt-containing nickel hydroxide and the aqueous solution of the alkali metal aluminate are fed continuously to a tube reactor.

A procedure is followed here in which the suspension of the cobalt-containing nickel hydroxide is fed into the tube reactor via a first intake and the aqueous solution of the alkali metal aluminate is added via a second intake arranged in the direction of flow downstream of the first intake.

However, it is also possible for the aqueous solution of the alkali metal aluminate to be fed into the tube reactor via a first intake and for the addition of the suspension of the cobalt-containing nickel hydroxide to be carried out via a second intake arranged in the direction of flow downstream of the first intake. It is furthermore possible for the aqueous solution of the alkali metal aluminate and the suspension of the cobalt-containing nickel hydroxide to be fed together into the tube reactor, the solution and suspension being mixed either before or during the feeding in.

In order to achieve a deposition of aluminium hydroxide on the particles of the cobalt-containing nickel hydroxide which is as homogeneous as possible, it is important for the aqueous solution of the alkali metal aluminate and the suspension of the cobalt-containing nickel hydroxide to be mixed homogeneously before the neutralization and therefore before the start of the precipitation reaction. Preferably, baffles which ensure intimate mixing of the solution and suspension are therefore provided in the tube reactor after the aqueous solution of the alkali metal aluminate and the suspension of the cobalt-containing nickel hydroxide have been passed in, and still before or shortly after the neutralization. These can be, for example, simple static baffle plates or tapers in the tube reactor. In contrast to the known mixing of the components by means of stirrers in a stirred reactor, the mechanical stress on the particles due to these measures is only low.

After the aqueous suspension of the cobalt-containing nickel hydroxide and the aqueous solution of the alkali metal aluminate have been passed into the tube reactor, the mixture formed is strongly alkaline and typically has a pH at room temperature of about 12 to 14. In order to convert the dissolved aluminate into aluminium hydroxide, which is then precipitated out of the aqueous environment and deposited on the surface of the cobalt-containing nickel hydroxide, it is necessary to neutralize the mixture.

The mixture of the suspension of the cobalt-containing nickel hydroxide and the solution of the alkali metal aluminate is neutralized by addition of an acid, sulfuric acid preferably being employed. 20 wt. % strength sulfuric acid is particularly preferably employed.

Preferably, the acid is passed continuously into the tube reactor via an intake (e.g., a neutralization intake) which is at a point in the tube reactor where the suspension of the cobalt-containing nickel hydroxide and the solution of the alkali metal aluminate are substantially homogeneously mixed (or mixed completely).

The intake of the acid is accordingly preferably arranged in the direction of flow downstream of the intake for the cobalt-containing nickel hydroxide and the intake for the solution of the alkali metal aluminate.

The acid is preferably passed into the reactor in an amount such that, after the acid has been fed into the tube reactor, the reaction mixture has a pH at the reaction temperature (e.g., at a temperature of from 10° C. to 60° C. or 20° C. to 50° C.) of from 7 to 8.5, particularly preferably in an amount such that a pH at the reaction temperature of from 7 to 7.5 is established. A high degree of supersaturation of the aluminium hydroxide formed is achieved at this pH, so that the individual aluminium hydroxide particles precipitate out before highly ordered crystalline phases have formed.

The short dwell time in the tube reactor due to the process, of typically less than 5 minutes, contributes towards the aluminium hydroxide being in the form of tiny amorphous particles, so that the desired coating of the cobalt-containing nickel hydroxide particles with amorphous aluminium hydroxide results. Preferably, the dwell time of the precipitation mixture in the tube reactor after addition of the acid is 10 to 180 seconds, particularly preferably 30 to 60 seconds.

A decisive advantage of the coating in a tube reactor compared with the conventional process procedure in a stirred reactor furthermore is that a plug flow develops in the tube reactor and an approximately identical dwell time in the reaction space thus results for the individual particles. The cobalt-containing nickel hydroxide particles are therefore coated very uniformly with approximately an identical amount of aluminium hydroxide, which promote homogeneous distribution of the aluminium in the mixed metal hydroxide and in the active material prepared therefrom for positive electrodes of secondary batteries.

The temperature at which the process according to the invention is carried out can be varied within wide limits. However, the formation of undesirable crystalline aluminium hydroxide phases is promoted with increasing temperature. Very high temperatures are therefore a disadvantage. Preferably, therefore, the process is carried out at a temperature of from 10 to 60° C., particularly preferably at a temperature of from 20 to 50° C.

The mixed metal hydroxide obtained can be separated off from the aqueous environment and worked up via known process steps. Typically, the suspension leaving the tube reactor is first filtered and washed. The filtration can be carried out, for example, via a suction filter, but also via continuously operating filtration apparatuses, for example a belt filter. The mixed metal hydroxide separated off in this way is then generally washed with distilled water once or several times.

Typically, a drying step follows. It has proved advantageous here to employ drying methods in which the material to be dried is exposed to only a very short heat treatment. Examples which may be mentioned are spray drying, drying in a hot air stream dryer and drying in a spin-flash dryer.

The mixed metal hydroxides according to the invention are outstandingly suitable for the preparation of active materials for positive electrodes for (or precursor of) secondary batteries, since active materials which are distinguished by a very homogeneous distribution of the metal components can be obtained.

The present invention therefore also provides the use of a mixed metal hydroxide according to the invention for the preparation of a starting composition for an active material for positive electrodes of a secondary battery, wherein a lithium compound is added to and mixed with the mixed metal hydroxide.

A suitable lithium compound is, for example, lithium nitrate, lithium hydroxide, lithium carbonate or mixtures thereof. Lithium hydroxide is preferably employed as the lithium compound.

The amount of lithium compound depends on the stoichiometry of the desired active material. Generally, the lithium compound is employed in an amount such that the molar ratio of lithium to the sum of the remaining metals (i.e., typically to the sum of nickel, cobalt and aluminium) is 0.9 to 1.1. Preferably, the lithium compound is employed in an amount such that the molar ratio of lithium to the sum of the remaining metals (i.e., typically to the sum of nickel, cobalt and aluminium) is 0.95 to 1.05.

The present invention also provides the use of a mixed metal hydroxide according to the invention for the preparation of an active material for positive electrodes of a secondary battery, wherein a lithium compound is added to and mixed with the mixed metal hydroxide as described above and the starting composition obtained in this way is calcined in an oxygen-containing atmosphere at a temperature of from 450 to 900° C. The calcining is preferably carried out at a temperature of from 600 to 800° C. The calcining time substantially depends on the calcining temperature chosen and is typically 5 to 50 hours.

The active material obtained in this way for positive electrodes of a secondary battery can be further processed to corresponding positive electrodes in a known manner. For example, the active material is mixed with acetylene black as a conductive additive and PTFE (polytetrafluoroethylene) as a binder in the desired ratio of amounts. The mixture formed is compression-moulded under a defined pressure to form an electrode film, and is then dried at, for example, 200° C. for about 24 hours.

The following examples serve to explain the invention in more detail, where the examples are intended to facilitate understanding of the principle according to the invention and are not to be understood as meaning a limitation thereof.

EXAMPLES

Unless stated otherwise, the percentage data are per cent by weight (wt. %).

Example 1

A suspension of a freshly precipitated nickel/cobalt hydroxide having a D50 of 14.8 µm and a molar Ni/Co ratio of 5.3 was transferred continuously from the precipitation reactor into a reservoir container. The concentration of nickel/cobalt hydroxide in the suspension was 120 g/l. The suspension furthermore contained sodium sulfate in a concentration of 180 g/l, ammonia in a concentration of about 11 g/l and the excess sodium hydroxide solution employed in the precipitation of the nickel/cobalt hydroxide. At the existing temperature of the suspension of 37° C., the pH of the suspension was about 12.5.

The suspension was transferred from the storage container via an overflow into a tube reactor which was connected directly to the overflow and has a diameter of 2.54 cm (1 inch). The volume flow of the suspension was 550 l/h. The tube reactor has three feed connectors located in succession in the direction of flow of the suspension, feed connectors 1, 2 and 3 being located in this sequence in the direction of flow of the suspension at an ever further distance from the intake point of the suspension. 1,100 l/h of completely deionized water (CD water) was added via feed connector 1 downstream of the suspension intake for dilution of the suspension. 5 l/h of a sodium aluminate solution were introduced into the tube reactor via the feed connector 2 following feed connector 1, the aluminium concentration in the sodium aluminate solution being 210 g/l. After the addition of sodium aluminate, the suspension passed through a first static mixer in the tube reactor for the purpose of homogenization. The amount of 20% strength sulfuric acid necessary for precipitation of Al(OH)$_3$ was fed into the tube reactor via the feed connector 3 arranged in the direction of flow of the suspension downstream of the static mixer. The addition of sulfuric acid was metered such that a pH of 7.0-8.0 was established in the tube reactor. After the addition of sulfuric acid, the suspension again passed through a static mixer in order to intensify the exchange of matter between the individual constituents of the suspension and to be able to achieve a homogeneous coating of the nickel/cobalt hydroxide with aluminium hydroxide. The dwell time of the suspension in the tube reactor after addition of the sulfuric acid was a further 30 seconds. The suspension was then led on to a belt dryer, on which washing of the coated co-precipitate with CD water took place. After the washing, the material was dried in a spin-flash dryer.

The NiCo(OH)$_2$ coated with amorphous aluminium hydroxide in this manner had a molar Al content of 5 mol %, based on the total amount of Ni, Co and Al metal. A comparison of the scanning electron microscopy photographs (SEM photographs) of non-coated and coated material demonstrates that the NiCo(OH)$_2$ was coated homogeneously. FIG. 2 shows the mixed metal hydroxide obtained (1,500-fold magnification). The particles showed a closed and dense coating with amorphous Al(OH)$_3$.

The D50 value of the mixed metal hydroxide obtained corresponded to that of the base material and was 14.7 μm. This shows that abrading of aluminium hydroxide did not occur during the coating. Had such an undesirable abrading occurred to a noticeable extent, the abraded aluminium hydroxide would be present in the form of very fine particles alongside the mixed metal hydroxide. The presence of a fraction of very fine particles would have led to a clear decrease in the D50 value. The tap density of the mixed metal hydroxide obtained was 2.1 g/cm$^3$.

The mixed metal hydroxide obtained was analysed by means of x-ray diffraction analysis (XRDA), a Phillips X'pert-MPB diffractometer having the following measurement parameters being used:

| | |
|---|---|
| Voltage: | 50 kV |
| Current: | 40 mA |
| Anode: | copper |
| Soller: | 0.04 rad |
| Divergence diaphragm: | 1° |
| Scattered ray diaphragm: | 1° |
| Receiving slit: | 0.2 mm |
| Step size: | 0.02° = 2theta |
| Measurement time per step: | 0.5 s |

FIG. 1 shows the corresponding x-ray diffraction spectrum. Only signals which correspond to the crystal structure of phase-pure Ni(OH)$_2$ were to be detected. Signals which could be assigned to a crystalline phase of the Al(OH)$_3$ are absent. The coating is accordingly amorphous aluminium hydroxide.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition comprising a lithium compound and a mixed metal hydroxide of comprising nickel, cobalt, and aluminum, wherein the mixed metal hydroxide has a particulate form comprising powder particles, and the powder particles have a core and a surface, said core of said powder particles comprising nickel/cobalt hydroxide, and said surface of said powder particles being coated with amorphous aluminum hydroxide, said mixed metal hydroxide prepared by precipitating aluminum hydroxide in the presence of cobalt-containing nickel hydroxide, by means of:

a) feeding continuously into a tube reactor, an aqueous suspension of cobalt-containing nickel hydroxide, and an aqueous solution of an alkali metal aluminate, thereby forming a mixture of said aqueous suspension of cobalt-containing nickel hydroxide and said aqueous solution of said alkali metal, and b) neutralizing the mixture of said aqueous suspension and said aqueous solution as it flows through said tube reactor, thereby converting the alkali metal aluminate into aluminum hydroxide, wherein said composition is a precursor of an active material for preparing positive electrode of a secondary battery.

2. The composition of claim 1 wherein said composition is calcined in an oxygen-containing atmosphere at a temperature of from 450 to 900° C.

3. The composition of claim 1 wherein said composition is calcined in an 50 to 93 mol % Ni, 5 to 30 mol % Co, and 2 to 20 mol % Al, the mole percents in each case being based on the total moles of Ni, Co and Al.

\* \* \* \* \*